(12) United States Patent  
Okita

(10) Patent No.: US 9,117,393 B2  
(45) Date of Patent: Aug. 25, 2015

(54) COLOR DISPLAY DEVICE AND METHOD

(75) Inventor: Masaya Okita, Saitama (JP)

(73) Assignee: HDT INC., Hiroshima (JP)

( * ) Notice: Subject to any disclaimer, the term of this patent is extended or adjusted under 35 U.S.C. 154(b) by 94 days.

(21) Appl. No.: 13/608,244

(22) Filed: Sep. 10, 2012

(65) Prior Publication Data

US 2013/0083088 A1 Apr. 4, 2013

Related U.S. Application Data

(63) Continuation of application No. PCT/JP2011/055406, filed on Mar. 8, 2011.

(30) Foreign Application Priority Data

Mar. 9, 2010 (JP) .................................. 2010-051309

(51) Int. Cl.
*G09G 3/36* (2006.01)
*G09G 5/02* (2006.01)
*G09G 3/34* (2006.01)
(Continued)

(52) U.S. Cl.
CPC .............. *G09G 5/028* (2013.01); *G09G 3/3413* (2013.01); *H04N 9/3111* (2013.01); *H04N 9/3155* (2013.01); *H04N 9/3197* (2013.01); *G09G 5/399* (2013.01); *G09G 2310/0235* (2013.01);
(Continued)

(58) Field of Classification Search
CPC ................ G09G 3/3413; G09G 5/028; G09G 2310/0235; G09G 2310/0237; G09G 2320/0242; G09G 2320/0247; G09G 5/399; H04N 9/3111; H04N 9/3155; H04N 9/3197

USPC ................................................... 345/87–111
See application file for complete search history.

(56) References Cited

U.S. PATENT DOCUMENTS 6,803,894 B1 10/2004 Hirota et al.
8,427,411 B2 * 4/2013 Tomizawa et al. ............. 345/88
(Continued)

FOREIGN PATENT DOCUMENTS

JP 2000-147548 A 5/2000
JP 2003-044016 2/2003
(Continued)

OTHER PUBLICATIONS

International Search Report issued in corresponding International Patent Application No. PCT/JP2011/055406 dated Jun. 14, 2011 (8 pages).

*Primary Examiner* — Kent Chang
*Assistant Examiner* — Nelson Rosario
(74) *Attorney, Agent, or Firm* — Kilyk & Bowersox, P.L.L.C.

(57) ABSTRACT

It is intended to provide a field sequential color display device capable of reducing the problem of saccadic color breakup. The color display device represents color images by depicting data of respective color images with a monochromatic display element in synchronism with sequential on-off switching to three color light sources of red, green and blue. Each display frame, which is the minimum cycle of sequential on-off switching of red, green and blue light sources to display any given color image, includes a red color field for displaying data of a red color image, a green color field for displaying data of a green color image and a blue color field for displaying data of a blue color image. In each green color field, at least the red light source or the blue light source is turned on and off in addition to the green light source.

18 Claims, 9 Drawing Sheets

(51) Int. Cl.
*H04N 9/31* (2006.01)
*G09G 5/399* (2006.01)

(52) U.S. Cl.
CPC .............. *G09G2310/0237* (2013.01); *G09G 2320/0242* (2013.01); *G09G 2320/0247* (2013.01)

(56) References Cited

U.S. PATENT DOCUMENTS

| | | | |
|---|---|---|---|
| 2002/0113764 A1 | 8/2002 | Yamada et al. | |
| 2004/0027677 A1 | 2/2004 | Okita | |
| 2005/0212740 A1* | 9/2005 | Miyagawa | ............. 345/89 |
| 2007/0146242 A1* | 6/2007 | Miller et al. | ............. 345/76 |
| 2008/0158141 A1 | 7/2008 | Yoshihara et al. | |
| 2009/0115719 A1* | 5/2009 | Lin et al. | ............. 345/102 |
| 2009/0128543 A1* | 5/2009 | Sarma et al. | ............. 345/214 |

FOREIGN PATENT DOCUMENTS

| | | |
|---|---|---|
| JP | 2003-270669 | 9/2003 |
| JP | 2003-295833 A | 10/2003 |
| JP | 2007-206698 | 8/2007 |
| JP | 2007-310286 A | 11/2007 |
| JP | 2009-180907 | 8/2009 |
| JP | 2009-251319 | 10/2009 |
| JP | 2010-032997 | 2/2010 |

\* cited by examiner

COLOR DISPLAY DEVICE AND METHOD

The present application is a continuation of International Patent Application No. PCT/JP2011/055406, filed on Mar. 8, 2011, which, in turn, claims priority from Japanese Patent Application No. 2010-051309, filed Mar. 9, 2010.

FIELD OF THE INVENTION

The present invention relates to a color display device and a color display method for representation of colors without using color filters. More specifically, the present invention relates to a color display device and a color display method suitable for application to displays of a field sequential system to represent colors by sequentially switching three color light sources of red, green and blue at a high speed.

BACKGROUND OF THE INVENTION

Field-sequential color display is known as a typical method for representing color images without using color filters. Devices of this type include light sources of three colors: red, green and blue; and a monochromatic display element. These color display devices produce color images by depicting monochromatic images with the monochromatic display element and synchronously switching the three color light sources on and off at a high speed. The monochromatic display element can be either reflection-type ones or transmission-type ones.

Color display devices of this type using no color filters (of a field sequential system) have various applications. Such examples are applications to liquid crystal displays and other monochromatic display elements. Further examples are applications to projectors. In case of projectors, a resolution equivalent to the resolution of a three-panel projector not using such a color display device can be achieved with a single-panel projector using the color display device, and the projectors can be simplified in optical system. Because of these and other advantages, applications to projectors have been marketed. A still further example is application to head mount displays that users can wear on heads to position their display portions in front of the users' eyes. In this application, because of their merit, i.e. compact and high-resolution color representation, some color display devices of the field sequential system have been proposed heretofore (Patent Documents 1 and 2). Furthermore, prototypes of large-scale, direct-view-type display devices have been demonstrated as well.

For easier understanding of the description hereinbelow about color display devices using the field sequential system, the following definitions are given. First of all, a minimum cycle in which three color light sources of red, green and blue sequentially turn on and off to display any given color is herein called a "display frame", and its length of time is called "one display frame period". A minimum cycle for displaying any one of the three colors is herein called a "color field", and its length of time is called "one color field period".

In existing field sequential color display methods, red, green and blue light sources are sequentially turned on and off once for each color as shown in FIG. 1, and the display frame comprising red→green→blue, for example, is repeated.

FIG. 2 is a block diagram that illustrates a drive circuit for an existing field sequential display device. FIG. 3 is a timing chart showing timings in the existing field sequential display device.

With reference to FIGS. 2 and 3, timings of image signals in the conventional field sequential display devices are explained. The drive circuit of FIG. 2 for the existing field sequential display device includes two frame memories that are a first frame memory and a second frame memory. These frame memories are controlled by a memory arbitration circuit to each write and read an image of one frame independently from each other.

With reference to FIG. 3, during a frame period in which "Image 1" is input as an image signal, data of "Image 1" is written in the first frame memory. Simultaneously in the same frame period, data of "Image 0", which was written in the second frame memory in the preceding frame period, is read out in the second frame memory in the order of the red color field, green color field and blue color field. After the data of each color image is written, the light source of each color is turned on and off, thereby representing a color image.

In the next frame period in which "Image 2" is input, data of "Image 2" is written in the second frame memory. Simultaneously in the same frame period, data of "Image 1", which was written in the first frame memory in the preceding frame period, is read out in the first frame memory in the order of the red color field, green color field and blue color field. After the data of each color image is written, the light source of each color is turned on and off, thereby representing a color image.

One of known problems with existing color display devices of the field sequential system is the issue of flickering. Flickering, however, may occur in other systems other than the field sequential system as well. It has been generally acknowledged that the on-and-off cycle (period) of red, green and blue light sources must be shorter than 1/60 second (Patent Document 3) for observers to be insensitive to flickering. Actually, however, the higher the luminance of color display devices, the higher the frequency level for human eyes to become insensitive to flickering. With this knowledge, the present Inventor already proposed a color display method for observers to be less sensitive to flickering (Patent Document 4).

As shown in FIG. 4 that shows a feature of this prior method of the present Inventor himself, this method proposes to compose one display frame of four color fields to turn the green light source on and off twice in each display frame in the order of, for example, red→green→blue→green and repeat this cycle.

Frequency at which human eyes become insensitive to flickering varies with color. Frequency at which most observers do not sense flickering of green color is twice that of red color or blue color. Therefore, the method shown in FIG. 4 in which the on-off frequency of green color is doubled relative to the frequency of display frames can keep observers insensitive to flickering even at a lower frequency of display frames. In the method of FIG. 4, each red color field and each blue color field intervene respectively between two green color fields, and each green color field results in being interposed between color fields of a composite color of red and blue in average. This is advantageous for a better uniformity of colors on a display screen even when the monochromatic display element used has a slow response speed. This property is especially useful with field sequential liquid crystal panels using nematic liquid crystal that has a relatively slow speed of behavior.

There is the problem of color breakup peculiar to color display devices of the field sequential system. It is generally said that color breakup occurs when motion pictures are displayed by field sequential color display devices. More specifically, with reference to FIG. 5, when a white square image moves in a black background, false colors are perceived along the boundaries intersecting the moving direction of the white square image.

"Color breakup in motion pictures" derives from the timings of storing general image signals in frame memories and retrieving them for respective color fields that are peculiar to the field sequential system. FIG. 6 illustrates how such color breakup appears in the conventional field sequential system.

Explained below are causes of color breakup with existing field sequential display devices with reference to FIGS. 3, 5 and 6.

Taking an existing field sequential display device with which the white square image is being displayed as moving at a uniform speed in the black background as shown in FIG. 5, FIG. 6 shows at (a) the motion of the white square image along the horizontal axis and its time along the vertical axis. As shown in FIG. 3, data of images of an identical position are outputted to the liquid crystal panel in one frame period and in one display frame period. Observer's eye tracking, however, moves at a constant speed following the motion of the image. This is shown by an inclined line at (a) of FIG. 6. FIG. 6 also shows at (b) relative positions of the image being displayed when assuming that the observer's eyes stay at a constant position. The image being displayed is recognized by the observer's eyes as an integrated, synthesized image. In the case where the white square image is moving at a uniform speed, positions displayed by respective colors are constant respectively as shown at (b) of FIG. 6, and this causes the observer to perceive color breakup shown by references III and IV at (b) of FIG. 6.

Additionally, in existing methods in which one frame consists of three color fields, if the display element used has a slow response speed, it cannot complete its full response before the light source of the next color field turns on, and the color of the next color field is undesirably mixed accordingly. As a result, the actually displayed color of the red color field appears yellowish with mixture of green. Similarly, the actually displayed color of the green color field becomes cyan-tinged, and the actually displayed color of the blue color field becomes magenta-tinged.

Therefore, display devices using liquid crystal as its display element, have the drawback that correct color representation is not possible especially in a low temperature range where the response speed of the liquid crystal becomes slower and hues of the colors are liable to rotate on the chromaticity diagram.

Existing display methods have a still further problem that color ununiformity occurs between the top and the bottom of the display screen. This is because, due to a time lag between the timing of writing data at the top of the screen and the timing of writing data at the bottom of the screen during writing of data while scanning the screen, degrees of color ununiformity differ from the top to the bottom of the display screen.

Color breakup of motion pictures can be reduced by an appropriate control of timings of frame memories. Heretofore, however, color breakup could not be removed completely even by such a timing control. This is because there is the problem of "saccadic color breakup" in addition to "color breakup of motion pictures".

"Saccadic color breakup" is a phenomenon in which a false color of a high saturation, not contained in the image displayed, is perceived randomly, momentarily. This occurs when eyes are moved swiftly because it causes a large movement of the viewing point in one frame period, which invites a large displacement of the image of red, green and blue.

It is a characteristic nature of saccadic color breakup that it occurs not only with motion pictures but also with still pictures, and it prominently occurs at boundaries between white and black of images exhibiting a high contrast. Increasing the frame frequency is a measure for removing this problem. Heretofore, however, this saccadic color breakup could not be removed even in projectors using the field sequential system that were doubled in frequency as compared with the normal frequency. This problem has been an obstacle against promulgation of color display devices using the field sequential system. Furthermore, since the approach by increasing the frame frequency results in increasing the power consumption of the display device, it has been difficult to increase the frame frequency in display devices using certain kinds of monochromatic display elements because of limited speeds of behavior of such display elements.

Patent Document 1: Japanese Patent Laid-open Publication No. 2010-32997
Patent Document 2: Japanese Patent Laid-open Publication No. 2009-251319
Patent Document 3: Japanese Patent Laid-open Publication No. 2007-206698
Patent Document 4: International Publication No. WO 01/095303 (International Application No. PCT/JP01/04813)

SUMMARY OF THE INVENTION

It is therefore an object of the invention to provide a color display device and a color display method capable of reducing color breakup including saccadic color breakup, which is one of problems involved in the field sequential system.

According to an aspect of the invention, the objects of the invention are achieved by providing a color display device for representing color images by combination of three light sources of red, green and blue with a monochromatic display element for displaying data of respective color images in synchronism with sequential on-off switching of the three light sources, characterized in that:

each display frame, which is a minimum cycle for sequential on-off switching of the red, green and blue light sources, includes a red color field for displaying data of a red color image, a green color field for displaying data of a green color image and a blue color field for displaying data of a blue color image, and at least the red light source or the blue light source is turned on and off in addition to the green light source in said green color field.

According to another aspect of the invention, the objects of the invention are achieved by providing a color display method for representing color images by combination of three light sources of red, green and blue with a monochromatic display element for displaying data of respective color images in synchronism with sequential on-off switching of the three light sources, characterized in that:

each display frame, which is a minimum cycle for sequential on-off switching of the red, green and blue light sources, includes a red color field for displaying data of a red color image, a green color field for displaying data of a green color image and a blue color field for displaying data of a blue color image, and at least the red light source or the blue light source is turned on and off in addition to the green light source in said green color field.

As to color breakup of motion pictures in the field sequential system, which has been considered difficult to solve heretofore, the present invention can largely reduce color breakup without the need for large modification of existing field sequential drive circuits. At the same time, the present invention can make saccadic color breakup less perceivable by not sacrificing so much the advantage of high color saturation of the field sequential system and not increasing so much the display frame frequency.

In typical embodiments of the present invention, each display frame is composed of four color fields: a red color field, a green color field, a blue color field and another green color field.

In a preferred embodiment of the invention, the red light source is turned on and off in the green color field in addition to the green light source.

In a preferred embodiment of the invention, first color fields of respective frame periods of image signals to be inputted change in color in the sequence of red, green, blue and green from one frame period to another.

Further objects and advantages of the present invention will become apparent from the detailed explanation of embodiments of the invention that follow.

DETAILED EXPLANATION OF THE INVENTION

An embodiment of the present invention is explained below with reference to FIG. 7, which is a timing chart of the field sequential display device according to the embodiment of the present invention, and FIG. 8, which shows an improved feature achieved by the embodiment of the present invention.

Figure 2:
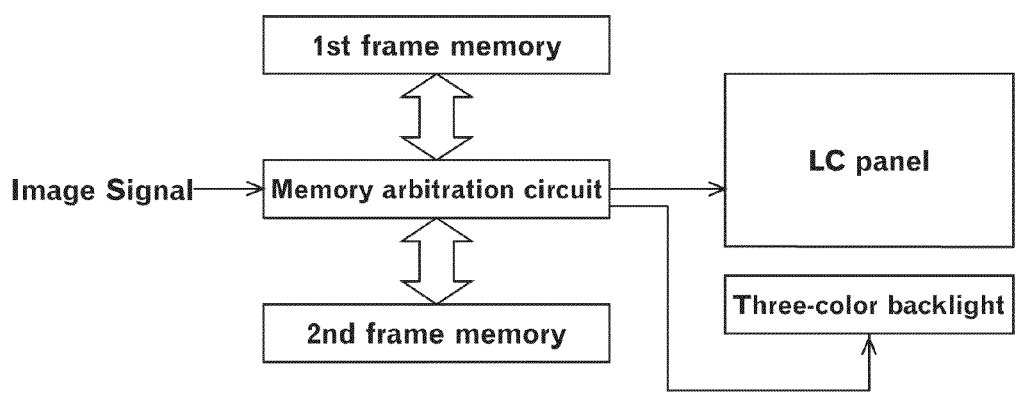
FIG. 2 is a block diagram of a drive circuit for the existing field sequential display device.
Figure 3:
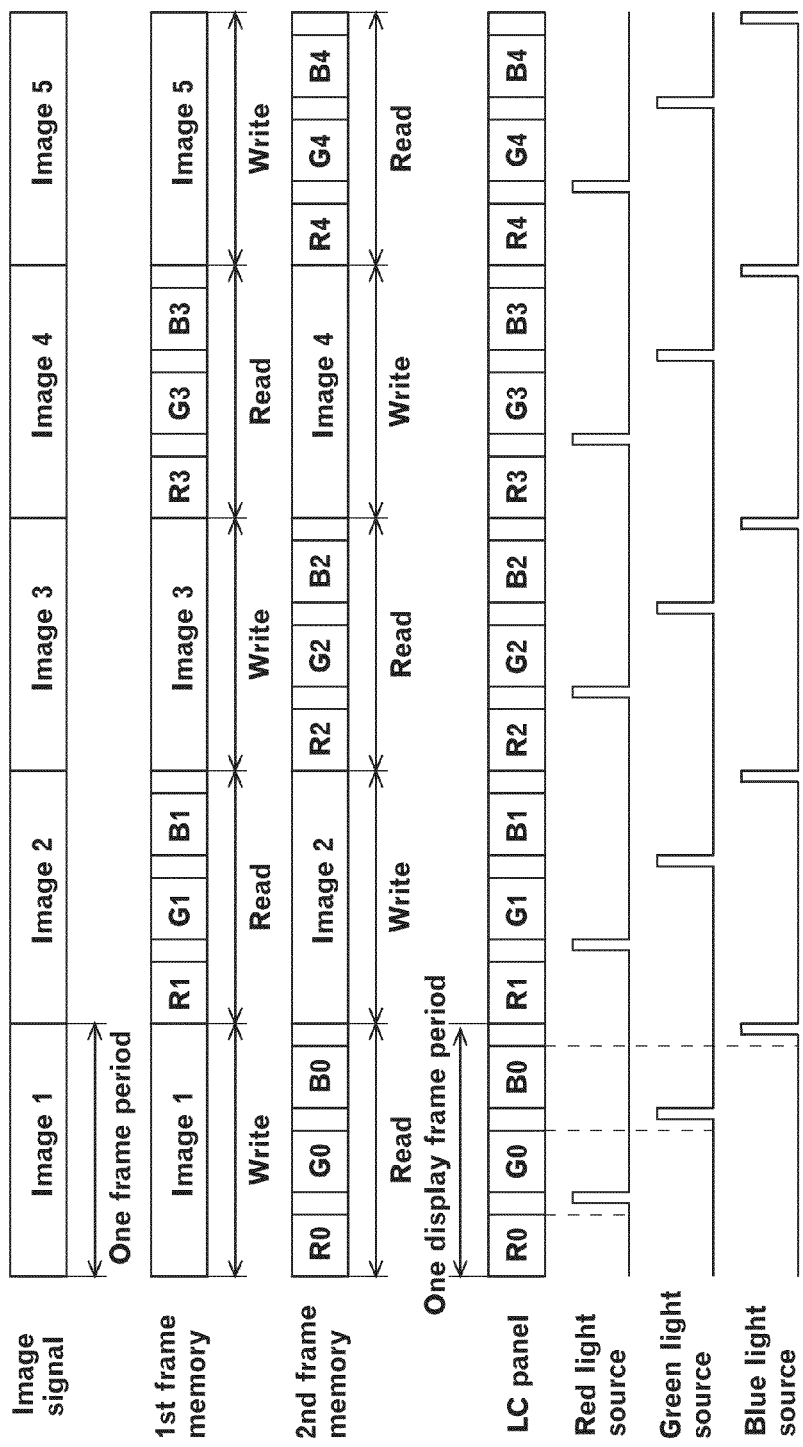
FIG. 3 is a timing chart of the conventional field sequential display device.
Figure 7:
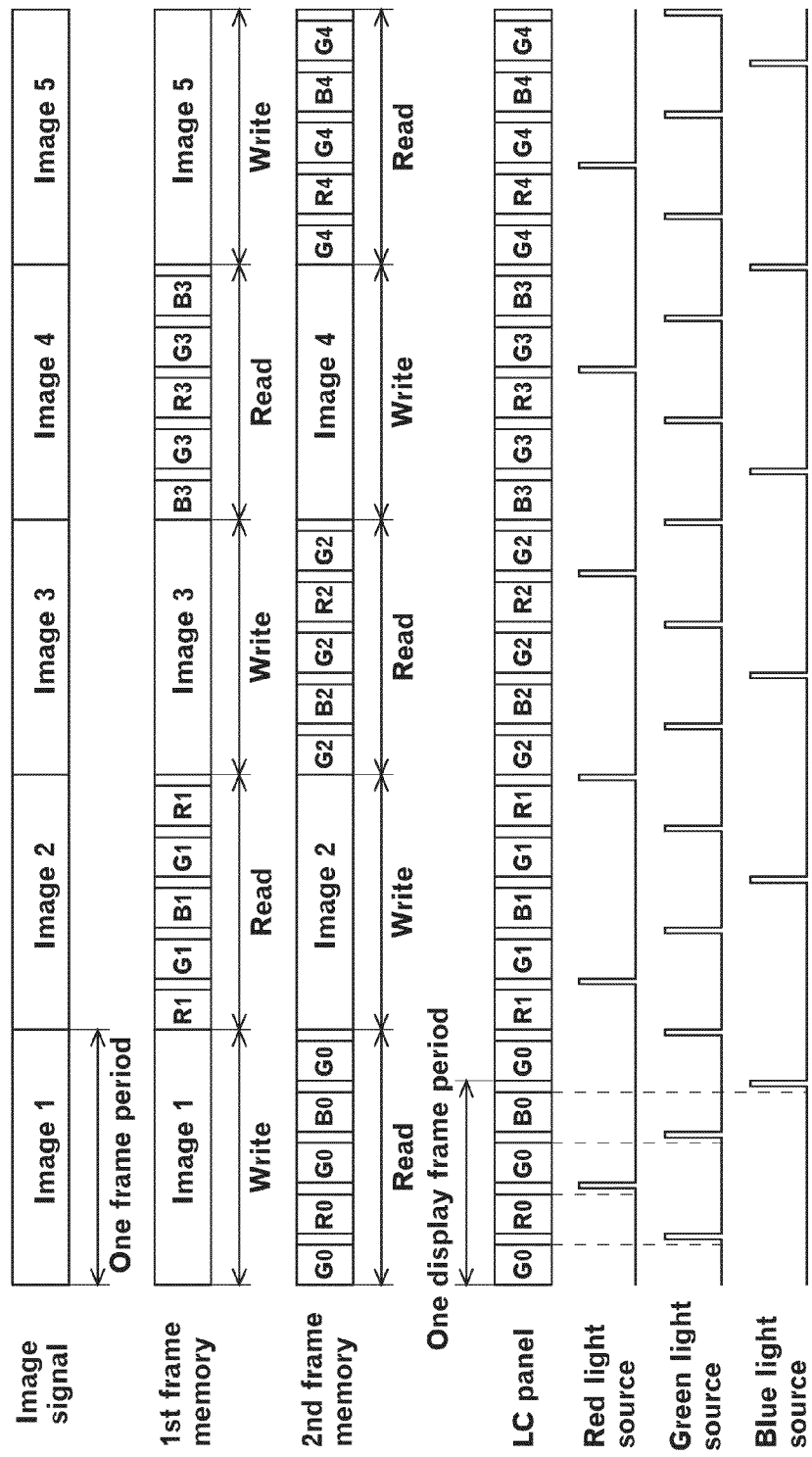
FIG. 7 is a timing chart of a field sequential display device according to the embodiment of the present invention, which corresponds to FIG. 3 of the existing device.
Figure 8:
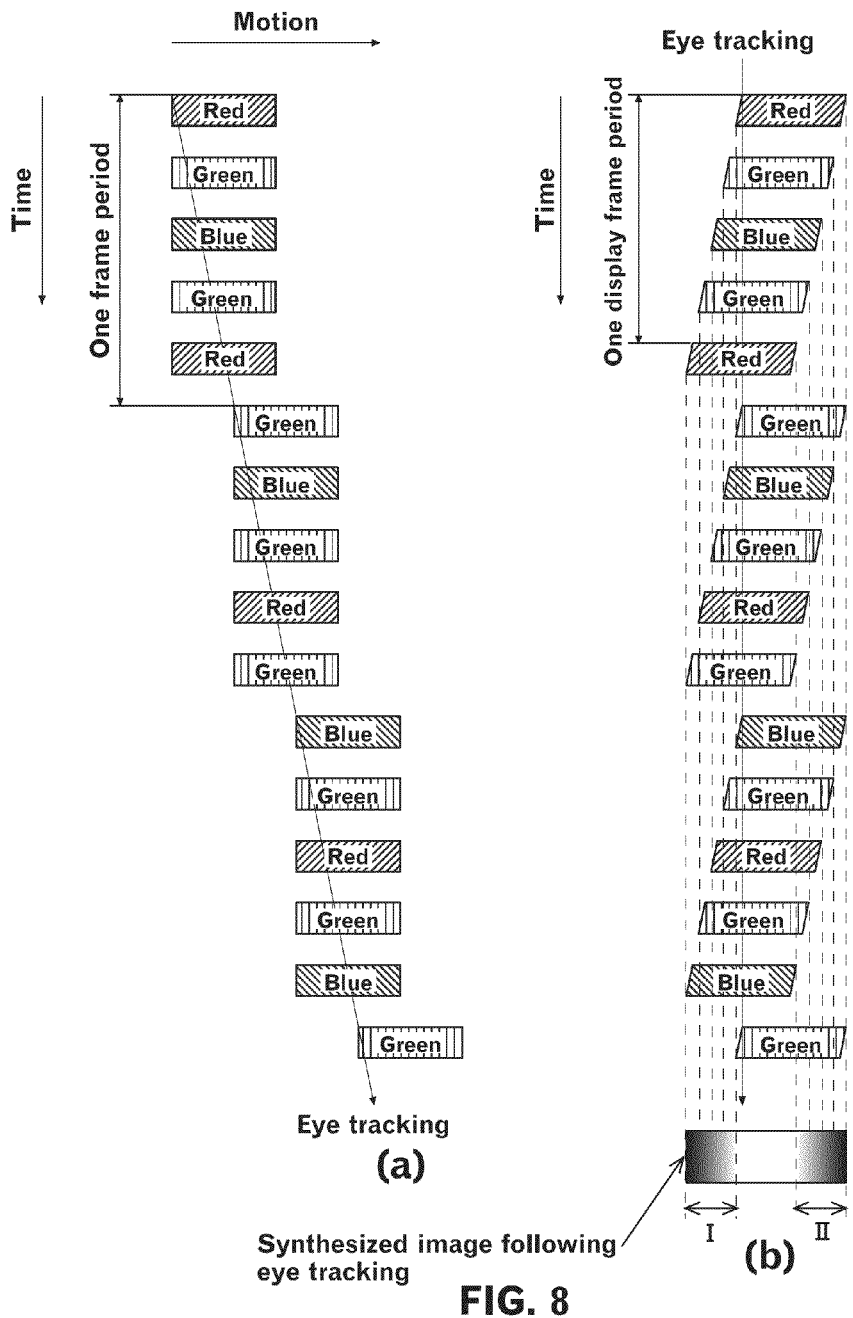
FIG. 8 is a diagram for explaining an effect achieved by the embodiment of the invention, which corresponds to FIG. 6 of the existing device.

A drive circuit used in the embodiment of the invention to realize the timing shown in FIG. 7 is basically the same as the drive circuit of FIG. 2 used in the existing field sequential display device. However, the drive circuit used in the embodiment of the invention is different from the existing one in that the timings of the memory arbitration circuit for reading data from the first and second frame memories to supply the liquid crystal panel with display data are different from those of existing systems as best understood in comparison with the timing of FIG. 3 (existing system).

The Inventor of the present application already proposed a field sequential system in which one frame is composed of four color fields, i.e., red, green, blue and green color fields to constitute one display frame (WO 01/095303). Frequency at which human eyes become insensitive to flickering varies with color, and frequency at which most observers do not sense flickering of green color is twice that of red color or blue color. Therefore, the Inventor of the present invention proposed in the former international application published as WO 01/095303 to turn the green light source on and off twice in each display frame period to thereby double the on-off frequency of the green light source as compared with the on-off frequency of the red light source or the blue light source. This proposal could render the flickering less perceivable even at a low frequency of display frames.

In this former method for lighting the green color twice in each display frame, each red color field and each blue color field intervene respectively between two green color fields, and each green color field results in being interposed between color fields of magenta that is a mixture of red and blue in average. Therefore, even when the monochromatic display element is low in response speed, green color is mixed in the red color field and the blue color field at both the top and the bottom of the display screen. Also in the green color field, magenta is mixed at both the top and the bottom of the display screen, and the color uniformity of the display screen is kept in a good condition. Alternatively, because of mixture of magenta that is a complementary color of green, the color displayed in the green color field approaches toward white color on green and magenta lines on the chromaticity diagram. Thus, the hue rotation stops.

For these reasons and for preventing rotation of hues, color ununiformity and flickering, the embodiment of the present invention drives the system by composing each display frame of four color fields in the order of red, green, blue and green.

Features of the embodiment of the invention are explained below with reference to FIGS. 7 and 8. In this embodiment, one frame period of image signals to be inputted is composed of five color fields. One display frame is composed of four color fields, i.e. red, green, blue and green color fields. First color fields of respective frame periods of image signals to be inputted change in color in the order of red, green, blue and green from one frame to another as shown at (a) of FIG. 8. Therefore, in the image following observer's eye tracking at (b) of FIG. 8, colors of color fields at the same display positions change for every frames in the order of red, green, blue and green. As a result, the image displayed at (b) of FIG. 8 is perceived by the observer as an integrated, synthesized image. Thus, it is recognized as white as indicated by references I and II at (b) of FIG. 8, and the observer does not perceive color breakup.

The Inventor of the present application experimentally drove a real field sequential liquid crystal panel at the timing according to the embodiment and evaluated scrolled images. In this experiment, the Inventor could confirm that color breakup of motion pictures could be reduced to a negligible level.

The timings employed in the embodiment of the invention do not need to change the write timings for the frame memories. Instead, it is sufficient to change the read-out cycle and order of the frame memories. Therefore, a device intended by the present invention can be realized by slightly changing an existing field sequential drive circuit.

The embodiment of the present invention explained above uses two frame memories, but a dual port memory may be used instead. As a modified version, the memory arbitration circuit may be redesigned with the use of a cash memory to control the read and write timings of this memory. In this case, an ordinary person in the art will readily understand that color breakup is largely reduced by outputting five color fields in one frame period even with one frame memory and composing one display frame of four color fields of red, green, blue and green.

The most common frame frequency of image signals is 60 Hz. In the embodiment of the invention, the display frame frequency is 5/4 times the frame frequency. Accordingly, the display frame frequency is 75 Hz. Thus, the on-off frequency of the green light source whose flickering are most perceivable for human eyes is 150 Hz, and the on-off frequency of the red light source and the blue light source is 75 Hz, respectively. Considering that CRT displays for personal computers are implemented with means for users to set the frame frequency at 75 Hz to reduce flickering, the on-off frequency of 75 Hz is acceptable for users having usual levels of sensitivity to flickering. Thus, the field sequential system according to the embodiment of the invention can realize the display frame frequency that keeps observers unperceivable to flickering even when the frequency of the image signal inputted is maintained at 60 Hz.

In this embodiment of the invention, in case the frame frequency of the image signal is 60 Hz, the display frame frequency is 75 Hz. However, in case the frame frequency of the image signal is 30 Hz or lower, the color field frequency may be adjusted such that colors of first color fields of respective frame periods vary from frame to frame. In this manner, it is still possible to reduce color breakup.

In this embodiment of the invention, the frame period is an integral multiple of the color field period. Synchronization, however, is not necessary between them. Only if it is ensured that colors of first color fields of respective frames vary from frame to frame at almost all occurrences, color breakup can be reduced as well.

Figure 9:
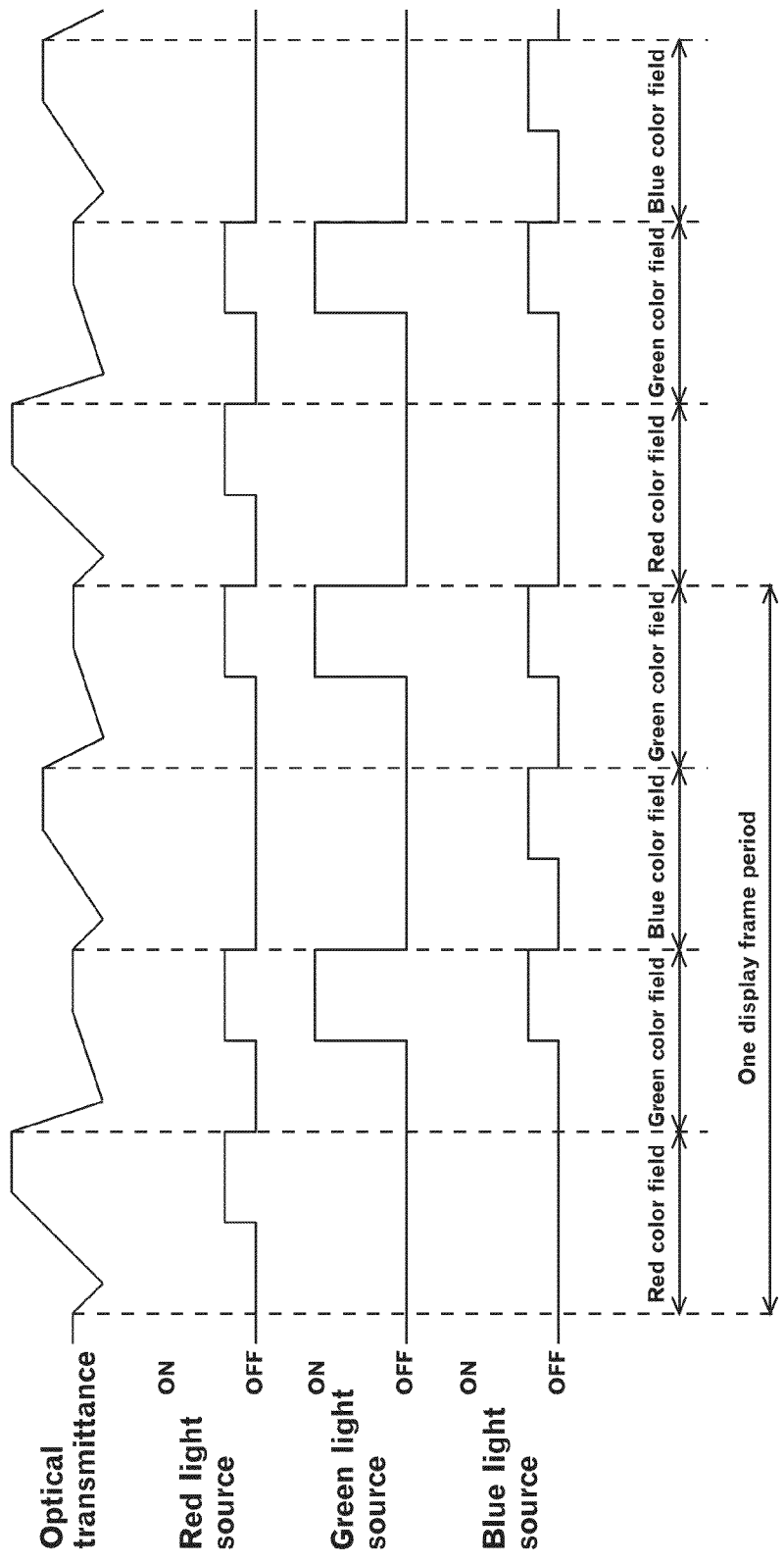
FIG. 9 is a diagram showing a relationship in time between optical transmittance of a display element and on-off switching of red, green and blue light sources in the embodiment of the invention.

FIG. 9 shows a relationship in time between optical transmittance of the display element and on-off switching of light sources of red, green and blue in the embodiment of this invention. As already explained, one display frame is composed of four color fields in the sequence of red, green, blue and green, and one display frame includes two green color fields.

Figure 1:
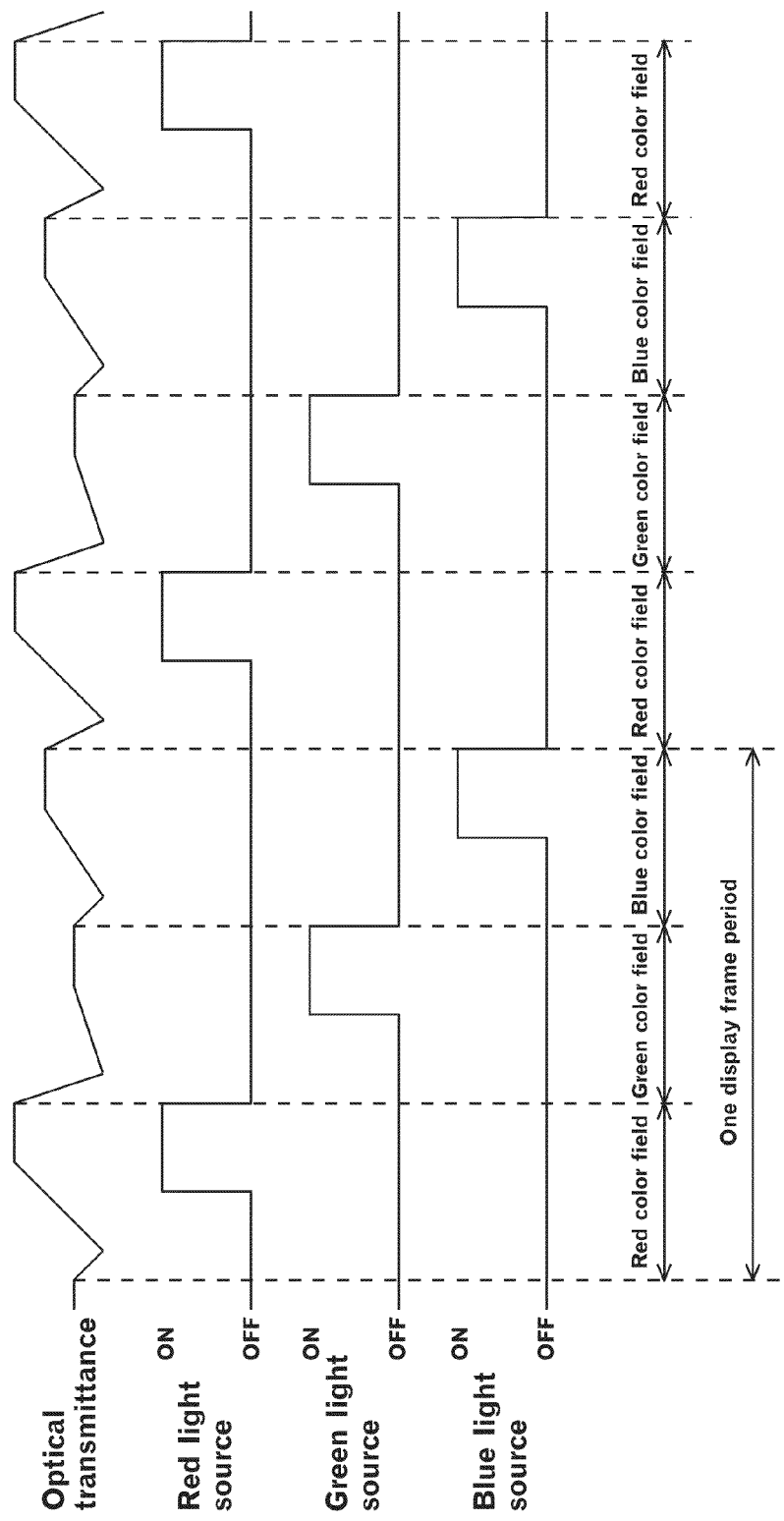
FIG. 1 is a diagram showing a relationship in time between optical transmittance of a display element and on-off switching of red, green and blue light sources in a typical existing color display device.

As explained earlier, FIG. 1 shows a time relationship between optical transmittance of a display element and on-off switching of red, green and blue light sources in a typical existing field sequential system taken as a comparative example. In this example, one display frame is composed of three color fields in the order of red, green and blue, and flickering is perceivable especially when green is displayed.

Figure 4:
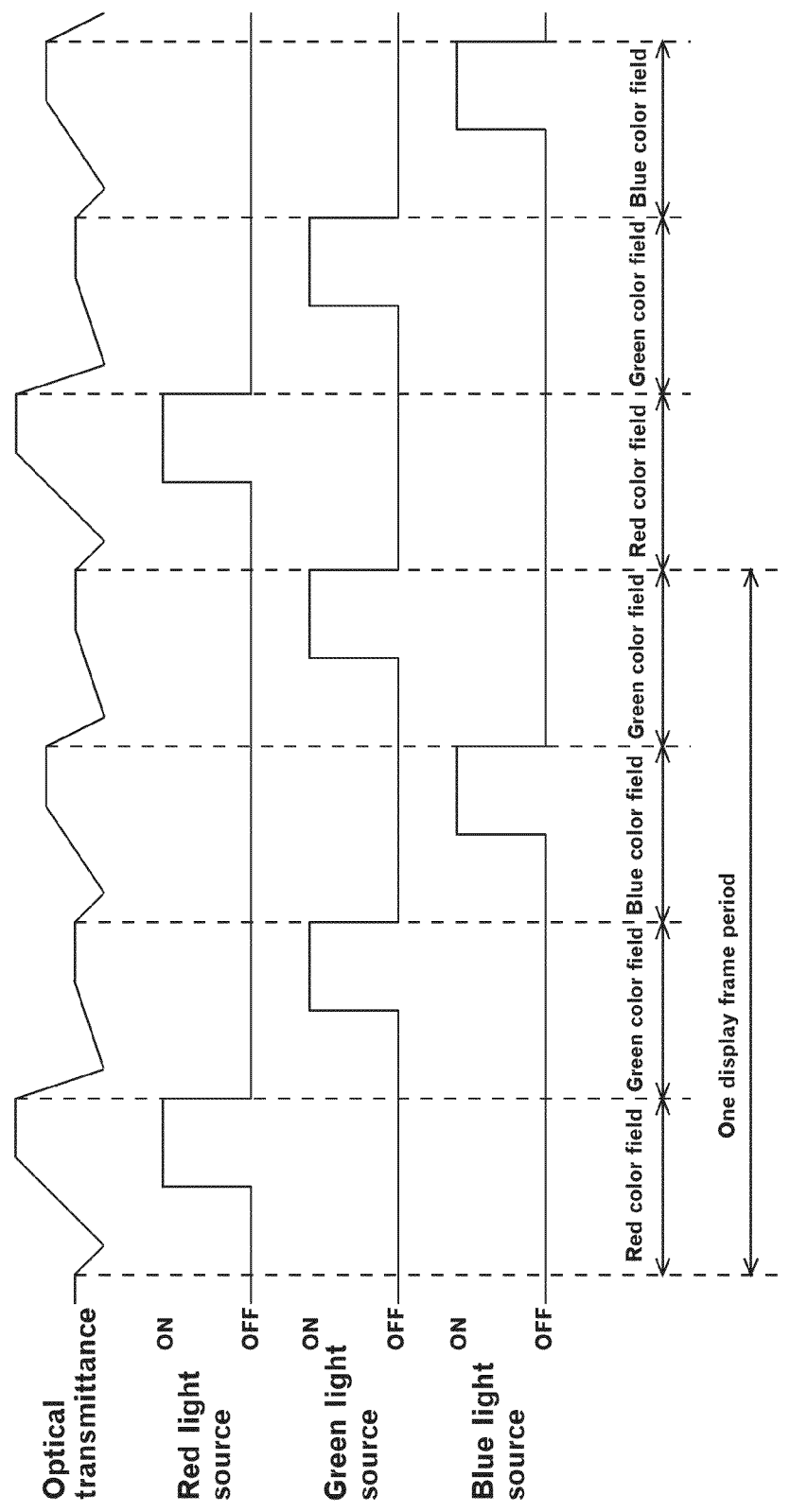
FIG. 4 is a diagram showing a relationship in time between optical transmittance of a display element and on-off switching of red, green and blue light sources in another existing color display device in which one frame is composed of one red color field, one blue color field and two green color fields.
Figure 5:
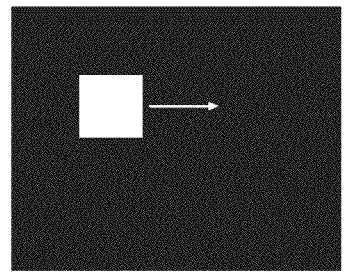
FIG. 5 is a diagram for explaining color breakup in a field sequential display device by way of a concrete example.
Figure 6:
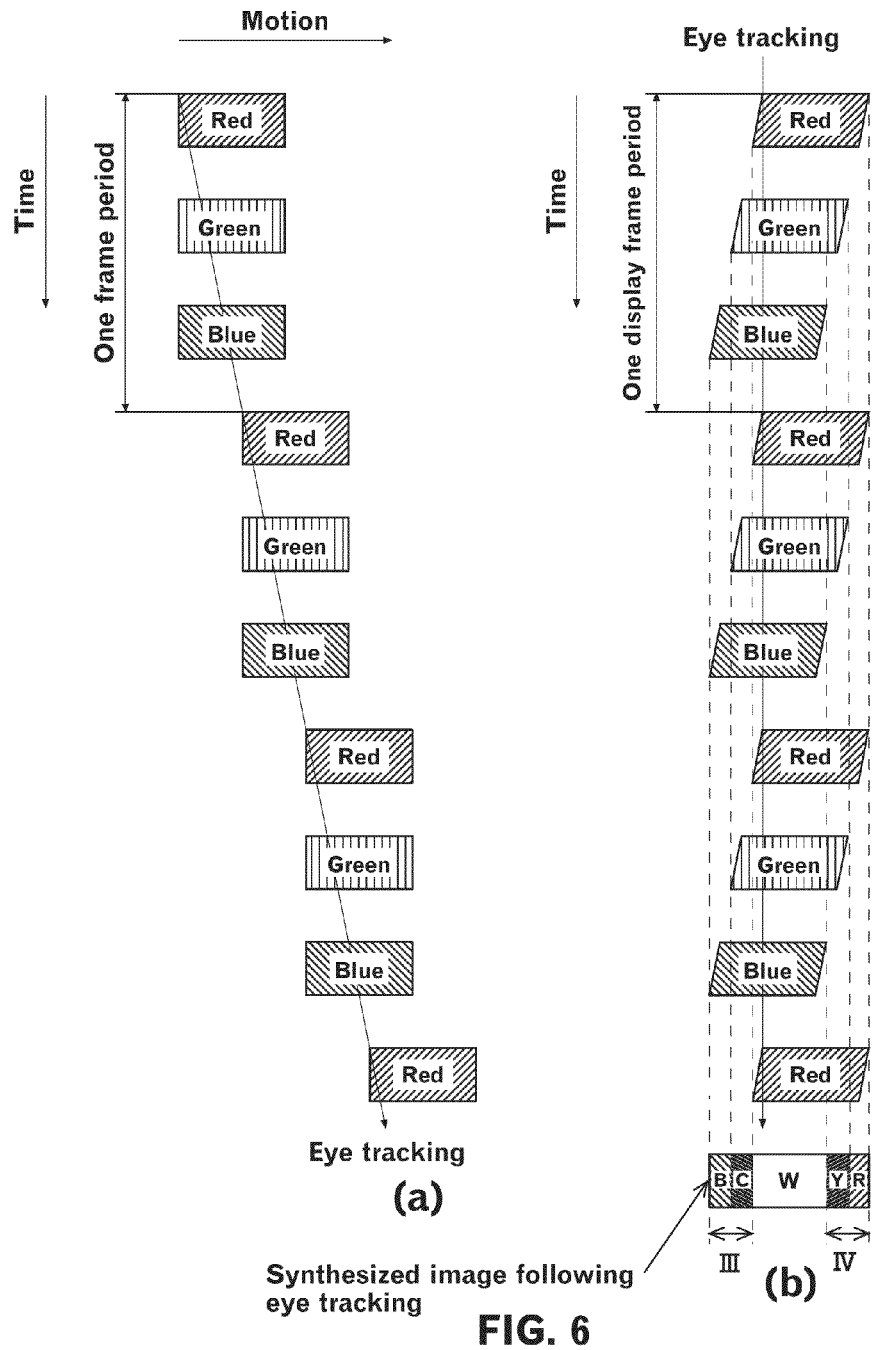
FIG. 6 is a diagram for explaining color breakup in a field sequential display device.

As referred to earlier, FIG. 4 illustrates a relationship in time between optical transmittance of a display element and on-off switching of red, green and blue light sources in a formerly proposed field sequential system in which the red light sources and the blue light sources are switched once respectively and the green light source is switched twice in one display frame period. In this former proposal of FIG. 4 in which the on-off switching frequency of the green light source is two times the display frame frequency, flickering is less perceivable. Even with this example of FIG. 4, however, saccadic color breakup could not be reduced. This is because the length of time for displaying red, for example, is only one quarter of color fields in one display frame period, and this causes observers to perceive red instantaneously because of offsetting of respective color images when their eyes move quickly. Especially, red is more perceivable than the other colors. Therefore, unless the ratio of light-up time of the red light source is increased, color breakup is perceived.

Referring back to FIG. 9, in a more preferable embodiment of the invention, when the green light source is turned on and off in each green color field, at least one of the red light source and the blue light source is additionally turned on and off in each green color field. More preferably, the green light source and the red light source are turned on and off together in each green color field. Most preferably, it is desirable to turn on and off all of the three light sources of green, red and blue in each green color field.

As best understood from comparison with FIG. 4 (existing system), quantity of red light in the red color field is lowered as compared with that in the red color field in the existing system of FIG. 4, and the decreased quantity of red light in the red color field is distributed to emission of the red light source in the green color fields such that the total quantity of red light in one display frame be substantially equal to the quantity of red light in one display frame in the existing system of FIG. 4. This is for the purpose of maintaining the white balance. Therefore, in case the display element displays a white image, a red image is displayed not only in the red color field but also in the green color fields. Thus, the red image is displayed in three quarters of color fields in one display frame.

The same is applicable to quantity of blue light in the blue color field as well. To maintain the white balance, quantity of blue light in the blue color field is lowered as compared with that in the blue color field in the existing system of FIG. 4, and the decreased quantity of blue light in the blue color field is distributed to emission of the blue light source in the green color fields such that the total quantity of blue light in one display frame be substantially equal to the quantity of blue light in one display frame in the existing system of FIG. 4. Therefore, a blue image, as well, is displayed in three quarters of color fields in one display frame. As a result, saccadic color breakup is removed to an unnoticeable level even without increasing the frequency of display frames. As to quantity of green light in the green color field, the number of color fields for turning it on is one half of the total color fields in one display frame. However, since the frequency of the green color fields is twice that of the red color field or the blue color field, regardless of the light-up time of the green light source being shorter than the light-up time of any other color light sources, color breakup of green is not perceivable as well like the other colors.

In the color display devices of the field sequential system according to the embodiment, at least the red light source or the blue light source is turned on and off in addition to the green light source in each green color field. More preferably, the green light source and the red light source are turned on and off in each green color field. Most preferably, the red light source and the blue light source are turned on and off in addition to the green light source in each green color field. Therefore, green saturation degrades. However, the red light source alone is turned on and off in the red color field; the blue light source alone is turned on and off in the blue color field; and the white balance is maintained approximately constant.

As a result, in a color display device in which at least the red light source or the blue light source is turned on and off in addition to the green light source in the green color field, red saturation and blue saturation do not degrade, but green saturation degrades. However, since human eyes are less sensitive to green saturation than to saturation of the other colors, the color gamut sensed by human eyes does not degrade so much as compared with the case where saturation is decreased for the three colors evenly.

As to the ratio of luminance for the red light source and the blue light source among respective color fields in the embodiment of the invention, its optimum value varies with the brightness of the color display device, its frame frequency, environmental light, and so on. However, it would be easy for an ordinary person in the art to adjust the ratio of luminance among respective light sources in respective color fields at an optimum value.

It is known that saccadic color breakup is not bothering so much when the brightness of the color display device is low. The lighting ratios of the red light source and the blue right source relative to the green light source in the green color field may be adjusted to enhance the green saturation of light in the green color field higher as the brightness of the color display device becomes lower if the display device is set in a low brightness level, that is, to enhance the green saturation by raising the ratio of quantity of green light in the green color field.

In the embodiment shown in FIG. 9, both the red light source and the blue light source are turned on and off simultaneously in addition to the green light source in the green color field. However, considering that red is especially perceivable when saccadic color breakup occurs, this embodiment may be modified to turn on and off the green light source and the red light source alone by omitting on-off switching of the blue light source.

Still in the same embodiment, only the red light source is turned on and off in the red color field. However, for the purpose of correcting the color coordinates of red on the chromaticity diagram, the green light source and/or the blue light source may be slightly turned on and off in addition to the red light source in the red color field. This is applicable to the blue color field as well.

In the embodiment of the invention, luminance of the red light source and the blue light source in each color field is adjusted by changing the peak luminance. However, any appropriate one of known adjustment schemes such as PWM modulation may be used for the same purpose.

The embodiment of the invention has been explained as one display frame being composed of four color fields of red, green, blue and green. However, even with a different composition of one display frame such as the composition with three color fields of red, green and blue in one display frame, it is still possible to remove saccadic color breakup to an unnoticeable level like in the embodiment explained above by controlling the on-off switching of the red light source, green light source and blue light source to enable reducing the green saturation of the green color field.

The invention claimed is:

1. A color display device for representing color images by combination of three light sources of red, green, and blue with a monochromatic display element for displaying respective color field data in synchronism with sequential on-off switching of the three light sources, comprising: memory means for storing inputted image signals as the color field data of red, green, and blue, and means for reading out each color field data of red, green, and blue sequentially from the memory means, wherein each display frame period, which is a minimum cycle for sequential on-off switching of the red, green, and blue light sources, includes at least a red color field for displaying the red color field data, a green color field for displaying the green color field data, and a blue color field for displaying the blue color field data, wherein a number of the color fields in each input frame period of the inputted image signals is larger than a number of the color fields in each display frame period by at least one color field, and wherein leading color fields in the input frame periods change in color from one to another sequentially every time when the one input frame period of the input image signal changes to a next input frame period, and then the next input frame period changes to a further input frame period, and at least the red light source is turned on and off in addition to the green light source in said green color field to alleviate saccadic color breakup.

2. The color display device according to claim 1, wherein each display frame period is composed of four color fields that are the red color field, the green color field, the blue color field, and a second green color field.

3. The color display device according to claim 1, wherein the leading color fields in the input frame periods vary in color in the order of red, green, blue, and green every time when one input frame period changes to the next input frame period, and then the next input frame period changes to the further input frame period.

4. The color display device according to claim 1, wherein each input frame period is composed of five color fields, and the display frame is composed of four color fields.

5. The color display device according to claim 4, wherein a frequency of the input frame periods is 60 Hz, and a frequency of the display frame periods is 75 Hz.

6. The color display device according to claim 1, wherein at least the red light source or the blue light source is turned on and off in addition to the green light source in the green color field.

7. The color display device according to claim 6, further comprising a luminance adjusting means for adjusting luminance of the light sources of respective colors to maintain a white balance of said color display device constant, wherein green saturation of light in the green color field is enhanced when the luminance adjusting means lowers brightness of the color display device.

8. The color display device according to claim 1, wherein the red light source is turned on and off in addition to the green light source in the green color field.

9. The color display device according to claim 8, further comprising a luminance adjusting means for adjusting luminance of the light sources of respective colors to maintain a white balance of said color display device constant, wherein green saturation of light in the green color field is enhanced when the luminance adjusting means lowers brightness of the color display device.

10. A color display method for representing color images by combination of three light sources of red, green, and blue with a monochromatic display element for displaying of respective color field data in synchronism with sequential on-off switching of the three light sources, comprising: storing input image signals as the color field data of red, green, and blue, and reading out each color field data of red, green, and blue sequentially from the stored image signals, wherein each display frame period, which is a minimum cycle for sequential on-off switching of the red, green, and blue light sources, includes at least a red color field for displaying the red color image field data, a green color field for displaying the green color field data, and a blue color field for displaying the blue color field data, wherein a number of the color fields in each input frame period of the inputted image signals is larger than a number of the color fields in each said display frame period by at least one color field, and wherein leading color fields in the input frame periods change in color from one to another sequentially every time when the one input frame period of the input image signal chanCes to a next input frame period, and then the next input frame period changes to a further input frame period.

11. The color display method according to claim 10, wherein each display frame period is composed of four color fields that are the red color field, the green color field, the blue color field, and a second green color field.

12. The color display method according to claim 10, wherein the leading color fields in the input frame periods vary in color in the order of red, green, blue, and green every time when one input frame period changes to the next input frame period, and then the next input frame period changes to the further input frame period.

13. The color display method according to claim 10, wherein each input frame period is composed of five color fields, and the display frame period is composed of four color fields.

14. The color display method according to claim 13, wherein a frequency of the input frame periods is 60 Hz, and a frequency of said the display frames frame periods is 75 Hz.

15. The color display method according to claim 10, wherein at least the red light source or the blue light source is turned on and off in addition to the green light source in the green color field.

16. The color display method according to claim 15, wherein luminance of the light sources of respective colors of the color display device is adjusted to maintain a constant white balance and wherein green saturation of light in the green color field is enhanced when the luminance adjusting means lowers brightness of the color display device.

17. The color display device according to claim 10, wherein the red light source is turned on and off in addition to the green light source in the green color field.

18. The color display method according to claim 17, wherein luminance of the light sources of respective colors of a color display device is adjusted to maintain a constant white balance and wherein green saturation of light in the green color field is enhanced when the luminance adjusting means lowers brightness of the color display device.

* * * * *

UNITED STATES PATENT AND TRADEMARK OFFICE
CERTIFICATE OF CORRECTION

| | |
|---|---|
| PATENT NO. | : 9,117,393 B2 |
| APPLICATION NO. | : 13/608244 |
| DATED | : August 25, 2015 |
| INVENTOR(S) | : Masaya Okita |

It is certified that error appears in the above-identified patent and that said Letters Patent is hereby corrected as shown below:

IN THE CLAIMS:

Claim 10, column 10, line 61, "chanCes" should read --changes--.

Signed and Sealed this
Fifth Day of January, 2016

Michelle K. Lee
*Director of the United States Patent and Trademark Office*